US009781910B1

(12) United States Patent
Burrell

(10) Patent No.: US 9,781,910 B1
(45) Date of Patent: Oct. 10, 2017

(54) CRAYFISH TRAP

(71) Applicant: Michael Alan Burrell, Idaho Falls, ID (US)

(72) Inventor: Michael Alan Burrell, Idaho Falls, ID (US)

(*) Notice: Subject to any disclaimer, the term of this patent is extended or adjusted under 35 U.S.C. 154(b) by 112 days.

(21) Appl. No.: 14/555,150

(22) Filed: Nov. 26, 2014

Related U.S. Application Data

(60) Provisional application No. 61/916,690, filed on Dec. 16, 2013.

(51) Int. Cl.
  *A01K 69/08* (2006.01)
  *A01K 69/06* (2006.01)
  *A01M 23/08* (2006.01)

(52) U.S. Cl.
  CPC .............. *A01K 69/08* (2013.01); *A01K 69/06* (2013.01); *A01M 23/08* (2013.01)

(58) Field of Classification Search
  CPC ........ A01K 69/06; A01K 69/08; A01K 69/10; A01M 23/08
  USPC ....................... 43/100, 102, 103, 105, 65, 66
  IPC ...................................................... A01M 23/08
  See application file for complete search history.

(56) References Cited

U.S. PATENT DOCUMENTS

| 131,439 | A | * | 9/1872 | Harcourt | ............... | A01M 21/00 43/100 |
| 147,899 | A | * | 2/1874 | Carnahan | ............. | A01M 23/08 43/66 |
| 178,375 | A | * | 6/1876 | McRoberts | ............ | A01K 69/06 43/100 |
| 366,984 | A | * | 7/1887 | Thomas | ................ | A01M 21/00 43/100 |
| 475,845 | A | * | 5/1892 | Bolling | ................. | A01M 21/00 43/100 |
| 644,386 | A | * | 2/1900 | Watts | .................... | A01M 23/08 43/100 |
| 764,085 | A | * | 7/1904 | Walton | .................. | A01M 23/08 43/66 |
| 768,406 | A | * | 8/1904 | Smith | .................... | A01M 21/00 43/65 |
| 1,077,098 | A | * | 10/1913 | Sebesta | ................. | A01M 21/00 43/65 |
| 1,222,191 | A | * | 4/1917 | Dodson | ................. | A01M 21/00 43/65 |

(Continued)

FOREIGN PATENT DOCUMENTS

| DE | 19844036 A1 | * | 4/1999 | ............ A01K 69/06 |
| EP | 1849356 A1 | * | 10/2007 | ............ A01K 69/10 |

(Continued)

*Primary Examiner* — Darren W Ark
(74) *Attorney, Agent, or Firm* — Ancel W. Lewis, Jr.

(57) ABSTRACT

A crayfish trap is configured to accommodate large crayfish. The crayfish trap includes a continuous wire mesh configured to form a top panel and a bottom panel. A forward spiked ramp and a rear spiked ramp are attached to the bottom panel. A plate is mechanically coupled to the bottom panel and configured to weight down the crayfish trap. A forward one-way door and a rear one-way door are attached to the top panel and slightly displaced from the forward spiked ramp and the rear spiked ramp permitting entry of the crayfish into the crayfish trap. A bait trap is attached to the plate configured to attract crayfish into the crayfish trap. The top panel includes a top access door configured to access the crayfish trap for baiting and crayfish removal.

5 Claims, 3 Drawing Sheets

(56) References Cited

U.S. PATENT DOCUMENTS

| | | | | |
|---|---|---|---|---|
| 1,226,288 | A * | 5/1917 | White | A01M 23/08 43/66 |
| 1,339,275 | A * | 5/1920 | Mueller | A01K 73/12 43/12 |
| 1,488,503 | A * | 4/1924 | Karda | A01M 23/08 43/66 |
| 1,638,767 | A * | 8/1927 | Harmon | A01M 23/08 43/65 |
| 2,119,828 | A * | 6/1938 | Nordenstam | A01K 69/08 43/100 |
| 2,530,449 | A * | 11/1950 | Bush | A01K 69/08 43/102 |
| 2,578,172 | A * | 12/1951 | Burton | A01M 23/08 43/65 |
| 2,716,304 | A * | 8/1955 | Taylor | A01K 69/10 43/100 |
| 2,760,297 | A * | 8/1956 | Buyken | A01K 69/08 43/105 |
| 3,314,187 | A * | 4/1967 | Marcinkowski | A01K 69/10 43/105 |
| 3,319,373 | A * | 5/1967 | Gale | A01K 69/08 43/100 |
| 3,387,403 | A * | 6/1968 | Crouch | A01K 69/08 43/100 |
| 3,497,989 | A * | 3/1970 | Manno | A01K 69/08 43/100 |
| 3,678,612 | A * | 7/1972 | Hendrickson | A01K 69/10 43/100 |
| 3,795,073 | A * | 3/1974 | Olsen | A01K 69/10 43/100 |
| 3,821,861 | A * | 7/1974 | Jalbert | A01K 69/08 43/100 |
| 3,906,654 | A * | 9/1975 | Leslie | A01K 69/08 43/100 |
| 3,906,655 | A * | 9/1975 | Lowenthal, Jr. | A01K 69/08 43/100 |
| 3,916,558 | A * | 11/1975 | Crouch | A01K 69/08 43/100 |
| 3,992,804 | A * | 11/1976 | Senese | A01K 69/08 43/100 |
| 4,030,232 | A * | 6/1977 | Niva | A01K 69/10 43/105 |
| 4,237,646 | A * | 12/1980 | Mims, III | A01K 69/06 43/105 |
| 4,305,219 | A * | 12/1981 | Ratliffe | A01K 69/06 43/105 |
| 4,406,083 | A * | 9/1983 | Hart | A01K 69/06 43/105 |
| 4,486,973 | A * | 12/1984 | Faucillon | A01K 69/08 43/100 |
| 4,509,288 | A * | 4/1985 | Shepherd | A01K 69/08 43/102 |
| 4,611,424 | A * | 9/1986 | Tarantino | A01K 69/08 43/100 |
| 4,730,411 | A * | 3/1988 | Katis | A01K 69/10 43/105 |
| 4,864,770 | A * | 9/1989 | Serio | A01K 69/10 43/100 |
| 4,905,405 | A * | 3/1990 | Hendricks | A01K 69/08 43/100 |
| 5,187,893 | A * | 2/1993 | Knight | A01K 69/06 43/100 |
| 5,203,281 | A * | 4/1993 | Harwich | A01K 5/01 119/57.9 |
| 5,259,809 | A * | 11/1993 | Rainey, Jr. | A01K 69/06 43/100 |
| 5,351,435 | A * | 10/1994 | Hill | A01K 69/10 43/100 |
| 5,410,837 | A * | 5/1995 | Kazzyk | A01M 23/18 43/66 |
| 5,640,800 | A * | 6/1997 | Peterson | A01K 69/04 43/100 |
| 5,839,220 | A * | 11/1998 | Wass | A01K 69/10 43/100 |
| 5,946,850 | A * | 9/1999 | Sarkisyan | A01K 69/06 43/100 |
| 6,550,180 | B1 * | 4/2003 | Le | A01K 69/08 43/100 |
| 7,533,486 | B2 * | 5/2009 | Ribeiro De Matos | A01K 69/10 43/100 |
| 7,886,480 | B2 * | 2/2011 | Philbrook | A01K 69/10 43/100 |
| 7,913,448 | B2 * | 3/2011 | December | A01K 69/06 43/100 |
| 8,117,783 | B2 * | 2/2012 | Hilty | A01K 69/06 43/100 |
| 2004/0181995 | A1 * | 9/2004 | Cheramie | A01K 69/10 43/105 |
| 2007/0261292 | A1 * | 11/2007 | December | A01K 69/06 43/100 |
| 2007/0264890 | A1 * | 11/2007 | Brown | A01K 69/00 43/102 |
| 2008/0256842 | A1 * | 10/2008 | Vasseghi | A01M 23/08 43/100 |
| 2011/0232157 | A1 * | 9/2011 | December | A01K 69/06 43/100 |
| 2013/0219769 | A1 * | 8/2013 | Hey | A01K 69/06 43/100 |
| 2016/0000055 | A1 * | 1/2016 | Best | A01K 69/10 43/100 |
| 2016/0106079 | A1 * | 4/2016 | Best | A01K 69/10 43/102 |

FOREIGN PATENT DOCUMENTS

| | | | | |
|---|---|---|---|---|
| FR | 2775871 A1 * | 9/1999 | | A01K 69/10 |
| JP | 09047190 A * | 2/1997 | | |
| NO | WO 2008105665 A1 * | 9/2008 | | A01K 69/08 |
| WO | WO 9315602 A1 * | 8/1993 | | A01K 69/06 |

* cited by examiner

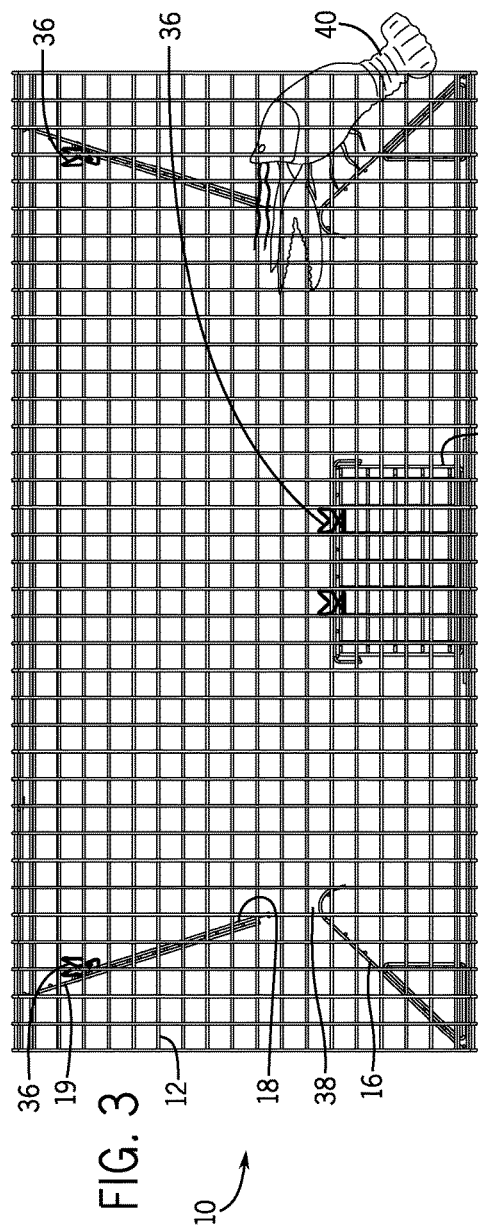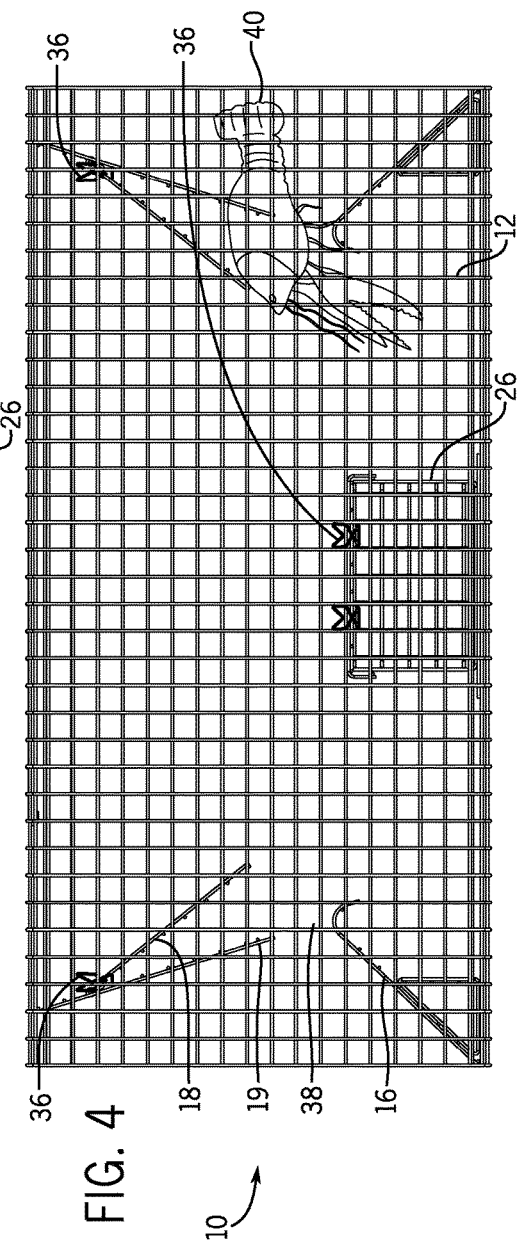

CRAYFISH TRAP

RELATED APPLICATION

This application claims priority to provisional patent application U.S. Ser. No. 61/916,690 filed on Dec. 16, 2013, the entire contents of which is herein incorporated by reference.

BACKGROUND

The embodiments herein relate generally to tools used to capture various varieties of crayfish. As used in this application, "crayfish" means freshwater crustaceans resembling small lobsters that are members of the superfamilies Astacoidea and Parastacoidea. Experiments were completed on orconectes *virilis* (commonly called virile crayfish or the northern crayfish) and pacifastacus leniusculus (commonly called the signal crayfish). However, it is understood that these experiments could be completed on any of the hundreds of other species of crayfish throughout the world.

Prior to embodiments of the disclosed invention, crayfish traps were difficult to fish with and typically were sold incomplete. Additionally, most crayfish traps were not capable of capturing larger crayfish due to smaller openings. Embodiments of the disclosed invention resolve this problem.

SUMMARY

A crayfish trap is configured to accommodate large crayfish. The crayfish trap includes a continuous wire mesh configured to form a top panel and a bottom panel. A forward spiked ramp and a rear spiked ramp are attached to the bottom panel. A plate is mechanically coupled to the bottom panel and configured to weight down the crayfish trap. A forward one-way door and a rear one-way door are attached to the top panel and slightly displaced from the forward spiked ramp and the rear spiked ramp permitting entry of the crayfish into the crayfish trap. A bait trap is attached to the plate configured to attract crayfish into the crayfish trap. The top panel includes a top access door configured to access the crayfish trap for baiting and crayfish removal.

In some embodiments the forward spiked ramp and the rear spiked ramp can be a low spiked curling entry ramp that permit entry but not exit of crayfish. A forward inner door harness can be mechanically coupled to the top panel, the forward spiked ramp and the forward one-way door. The forward inner door harness can be inclined downward from the top panel to the forward spiked ramp to prevent crayfish from exiting the crayfish trap. Likewise, a rear inner door harness can be mechanically coupled to the top panel, the rear spiked ramp and the rear one-way door. The rear inner door harness can be inclined downward from the top panel to the rear spiked ramp to prevent crayfish from exiting the crayfish trap.

In some embodiments, a hook can be attached to the top panel and the top access door to prevent the top access door from opening. In some embodiments, a left rope can be attached to the top panel and tied to form a left loop. A right rope can be attached to the top panel and tied to form a right loop. A carabineer can be attached to the left loop and the right loop, in order to raise and lower the crayfish trap.

BRIEF DESCRIPTION OF THE FIGURES

The detailed description of some embodiments of the invention is made below with reference to the accompanying figures, wherein like numerals represent corresponding parts of the figures.

FIG. 3 is a side elevation view with the door shown in a closed position.

FIG. 4 is a side elevation view with the door shown in an open position.

DETAILED DESCRIPTION OF CERTAIN EMBODIMENTS

Figure 1:
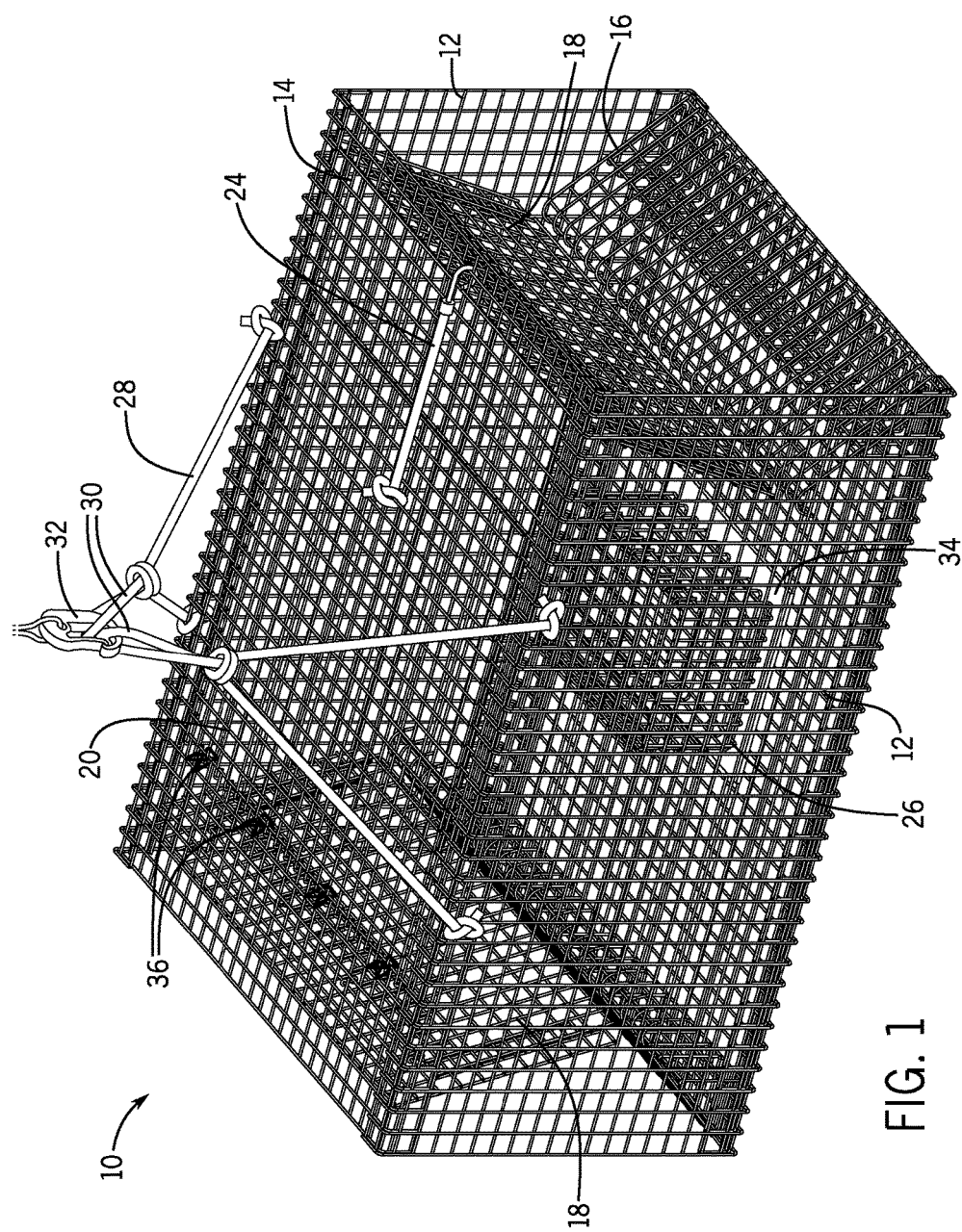
FIG. 1 is a perspective view of an embodiment of the invention.
Figure 2:
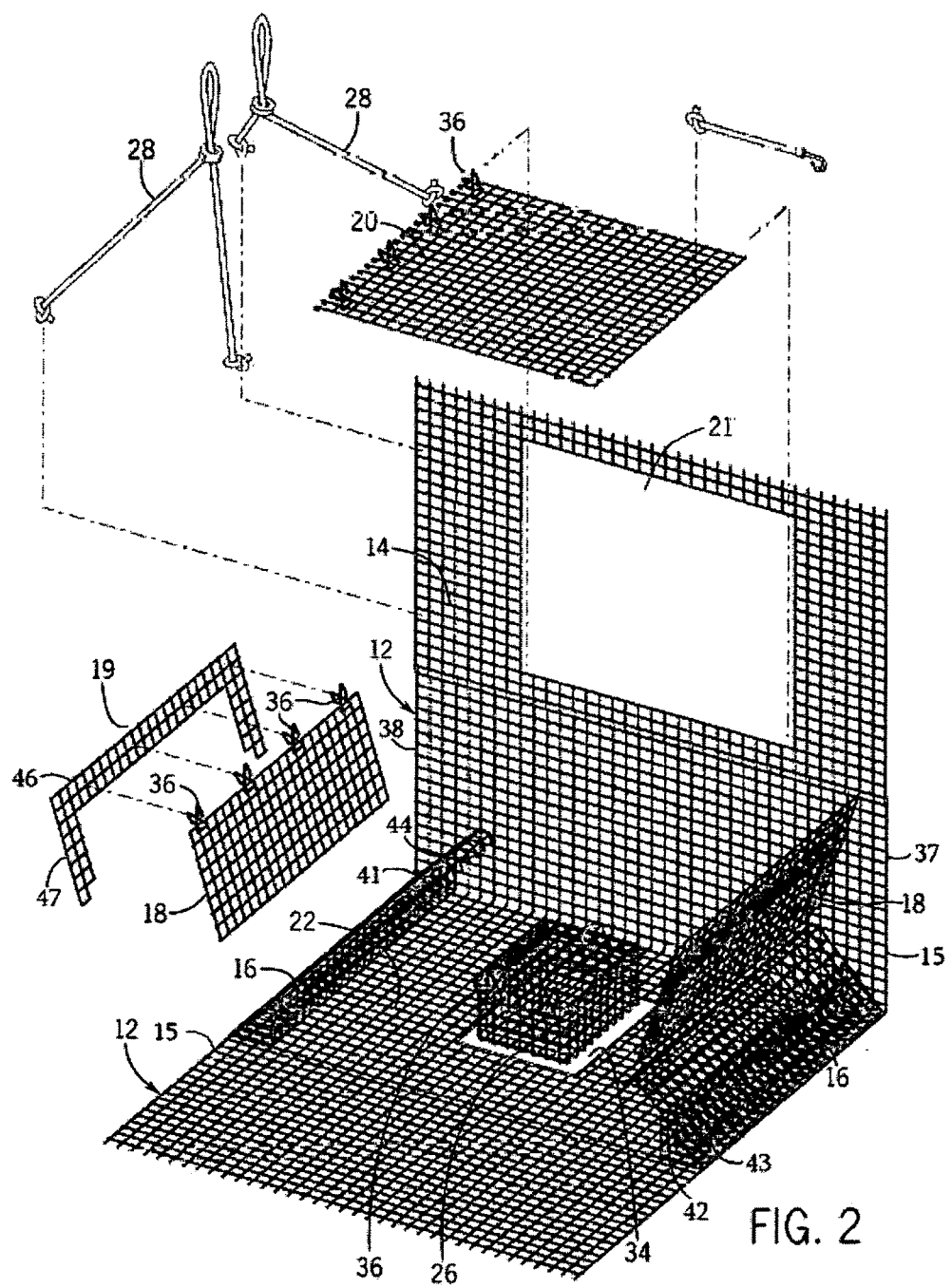
FIG. 2 is an exploded perspective view of an embodiment of the invention.

Referring to FIGS. 1 to 4, a crayfish trap 10 embodying features of the present invention includes a body 12, two ramps 16, two door harnesses 19 and two one-way doors 18, all made of rigid mesh. The rigid mesh can be wire mesh including a rubber coated or powder coated wire mesh. The body 12 has a top panel 14, a spaced bottom panel 22, and a pair of spaced, parallel side panels 15 that each extend between and connect the top and bottom panels 14 and 22. The body 12 has a box shape with open forward and rear ends 37 and 38. A ramp 16 slopes inwardly from the forward end 37 and upwardly from the bottom panel 22, and the other ramp 16 slopes inwardly from the rear end 37 and upwardly from the bottom panel 22. Each ramp 16 extends transversely from one side panel 15 to the other side panel 15. The inner end 41 of each ramp 16 curls inwardly and downwardly. The mesh of the ramps 16 includes bars 42 that extend parallel to the side panels 15 and crossbars 43 transverse to the bars 42. The bars 42 extend significantly beyond the innermost crossbar 43 at the inner end 41 of each ramp 16 to form a plurality of protruding spikes 44 that project inwardly and downwardly.

The door harnesses 19 each have a base 46 and a pair of spaced side arms 47 that project transversely from opposite ends of the base 46 to form a U shape. The base 46 of one door harness 19 is rigidly attached to the top panel 14 near the forward end 37 with the side arms 47 sloping inwardly, downwardly. Each side arm 47 extends along and attaches to a respective side panel 15. The base 46 of the other door harness 19 is rigidly attached to the top panel 14 near the rear end 38 with the side arms 47 sloping inwardly, downwardly. Each side arm 47 extends along and attaches to a respective side panel 15. The one-way doors 18 are generally rectangular in shape and wider than the distance between the side arms 47 of each door harness 19. The upper ends of the one-way doors 18 are rotatably mounted to the bases 46 of the respective door harnesses 19 at the forward and rear ends 37 and 38 of the body 12. The one-way doors 18 are mounted inwardly of the door harnesses 19 such that the side arms 47 support the one-way doors 18 at the same angle as the side arms 47. The one-way doors 18 are angled or sloped relative to vertical when closed, and thereby biased by gravity to the closed position. The one-way doors 18 rotate upwardly and inwardly to open. The side arms 47 prevent the one-way doors 18 from rotating outwardly. The lower ends of the one-way doors 18 are spaced or displaced above the highest portions of the ramps 16 a selected distance so that crayfish 40 can partially enter the crayfish trap 10 before the crayfish 40 has to start pushing the one-way door 18 open. The large one-way doors 18 allow crayfish 40 up to 12 inches long to enter the trap. As used in this application a "large crayfish" is a crayfish up to twelve inches long measured from pinchers to tail.

A heavy plate 34 attaches to the bottom panel 22. Plate 34 can be made from a heavy metal. A bait trap 26 attaches to the top of the plate 34. Top panel 14 includes an access door opening 21 and an access door 20 that extends across and covers the access door opening 21. The access door 20 is rotatably mounted on the top panel 14. A hook 24 keeps top access door 20 from opening. The hook 24 can be made from surgical tubing. A pair of ropes 28 are tied to opposite sides of the top panel 14 to a pair of loops 30. A carabiner 32 hooks through both loops 30 to raise and lower the crayfish trap 10.

FIG. 3 and FIG. 4 show crayfish trap 10 in use. Top access door 20 allows for complete access to the inner cage for baiting bait trap 26 and easy removal of caught crayfish 40. The ramps 16 allow large crayfish 40 to easily enter crayfish trap 10. Once in, the curl of the inner end 41 of each ramp 16 and the inwardly and downwardly protruding spikes 44 prevent the crayfish 40 from exiting the crayfish trap 10.

Forward one-way door 18 is angled towards the forward spiked ramp 16 which allows the forward one-way door 18 to only open one way and stay shut with gravity. The forward one-way door 18 uses the forward inner door harness 19 to hold it and thus it is lighter and does not impede crayfish entry. Rear one-way door 18 is angled towards the rear spiked ramp 16 which allows the rear one-way door 18 to only open one way and stay shut with gravity. The rear one-way door 18 uses the rear inner door harness 19 to hold it and thus it is lighter and does not impede crayfish entry. Forward and rear one-way doors 18 do not extend all the way to the forward and rear spiked ramps 16. This creates trap openings 38, which allow crayfish 40 to start entering crayfish trap 10 without obstruction or distractions. Crayfish trap 10 has a locking bait trap 26 to keep bait intact for longer. Plate 34 allows the crayfish trap 10 to sink to the bottom straight and also keeps the bait from being eaten from the underside of the trap. This also forces the crayfish to enter crayfish trap 10 to get to the bait.

Looped connecting ropes 28 are connected at four points at the top of crayfish trap 10 to allow a larger top access door 20. It also allows the simplicity of clipping the loops 30 to carabiner 32 without hassles or knots. This makes setting and retrieval of the traps much more efficient and time saving.

Other traps are black, green or silver, which are odd looking to crayfish. Embodiments of the present invention can be tan or mud color to blend in with the environment and without looking odd to the crayfish even in the day.

Experiment 1: Virile Crayfish

Crayfish trap 10 was taken to Strawberry Reservoir, Utah where it was used for three days. The bait chosen was fish (salmon). After one half hour, the traps were removed from the water and 15-40/trap of virile crayfish were captured. Other crayfish traps had only been able to obtain 0-10/trap crayfish in a similar period of time. Hours of underwater Go Pro camcorder footage proved that the entryways worked exactly as stated, Experiment 2: Signal Crayfish Crayfish trap 10 was taken to Ririe Reservoir, Idaho where it was used for twenty non-consecutive days. The bait chosen was fish (salmon). After one half hour, the traps were removed from the water and 10-40/trap of signal crayfish were captured. Other crayfish traps had only been able to obtain 0-3/trap crayfish in a similar period of time. Hours or underwater Go Pro camcorder footage proved that the entryways worked exactly as stated, Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A crayfish trap configured to accommodate large crayfish, the crayfish trap comprising:
   a wire mesh body having a top panel, a spaced bottom panel, a pair of spaced, parallel side panels that each extend between and connect the top and bottom panels to form a box shape with open forward and rear ends;
   a pair of mesh ramps attached to the bottom panel, with one ramp of the pair of ramps extending upwardly and inwardly toward an interior of the crayfish trap from the forward end and the other ramp of the pair of ramps extending upwardly and inwardly toward the interior of the crayfish trap from the rear end, the ramps extending transversely from one side panel of the pair of side panels to the other side panel of the pair of side panels, the ramps each including an inner end within the interior of the crayfish trap that curls inwardly and downwardly, wherein the inner end of each ramp includes a plurality of inwardly and downwardly protruding spikes, thereby permitting entry but not exit of crayfish;
   a plate mechanically coupled to the bottom panel and configured to weight down the crayfish trap;
   a pair of mesh one-way doors with one one-way door of the pair of one-way doors sloping inwardly toward the interior of the crayfish trap, downwardly from near the top panel near the forward end when closed and the other one-way door of the pair of one-way doors sloping inwardly toward the interior of the crayfish trap, downwardly from near the top panel near the rear end when closed, the one-way doors being spaced above the respective ramps of the pair of ramps when closed, permitting partial entry of a crayfish into the crayfish trap before the respective one-way door starts to open;
   a bait trap attached to the plate configured to attract crayfish into the crayfish trap;
   wherein the top panel further comprises a top access door configured to access the interior of the crayfish trap for baiting and crayfish removal.

2. The crayfish trap of claim 1, further comprising a door harness having a base mechanically coupled to the top panel near the forward end and a pair of spaced side arms attached to the pair of side panels with the side arms sloping inwardly, downwardly from the base, wherein the one one-way door near the forward end is wider than a distance between the side arms, has an upper end rotatably mounted to the base of the door harness and is mounted inwardly of the door harness such that the side arms support the one one-way door at a same angle as the side arms.

3. The crayfish trap of claim 2, further comprising an other door harness having a base mechanically coupled to the top panel near the rear end and a pair of spaced side arms attached to the pair of side panels with the side arms sloping inwardly, downwardly from the base, wherein the other one-way door near the rear end is wider than a distance between the side arms, has an upper end rotatably mounted to the base of the other door harness such that the side arms support the other one-way door at a same angle as the side arms.

4. The crayfish trap of claim 3, further comprising a hook, attached to the top panel and the top access door to prevent the top access door from opening.

5. The crayfish trap of claim 3, further comprising
a left rope, attached to the top panel and tied to form a left loop;
a right rope, attached to the top panel and tied to form a right loop; and
a carabiner, attached to the left loop and the right loop, in order to raise and lower the crayfish trap.

\* \* \* \* \*